(12) United States Patent
Kim

(10) Patent No.: US 7,621,136 B2
(45) Date of Patent: Nov. 24, 2009

(54) SYSTEM AND METHOD FOR OPERATING AIR CONDITIONER USING SOLAR HEAT

(75) Inventor: Yong Chul Kim, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 293 days.

(21) Appl. No.: 11/600,399

(22) Filed: Nov. 15, 2006

(65) Prior Publication Data

US 2008/0047277 A1 Feb. 28, 2008

(30) Foreign Application Priority Data

Aug. 28, 2006 (KR) ...................... 10-2006-0081806

(51) Int. Cl.
*F25B 21/02* (2006.01)
(52) U.S. Cl. ................................. 62/3.3; 62/3.2; 62/244
(58) Field of Classification Search ................ 165/48.2
See application file for complete search history.

(56) References Cited

U.S. PATENT DOCUMENTS

| 5,233,227 A | * | 8/1993 | Kajimoto et al. ............. 307/9.1 |
| 5,681,218 A | * | 10/1997 | Kishi et al. ................... 454/75 |
| 2004/0065101 A1 | * | 4/2004 | Krupp et al. .................. 62/244 |

OTHER PUBLICATIONS

NPL—Michigan State University Extention: Home Maintenance and Repair (Jun. 24, 2003).*

* cited by examiner

*Primary Examiner*—Cheryl J Tyler
*Assistant Examiner*—Lakiya Rogers
(74) *Attorney, Agent, or Firm*—Edwards Angell Palmer & Dodge LLP; Peter F. Corless

(57) ABSTRACT

The present invention provides a system for controlling at least two functions selected from the group consisting of ventilation, air cleaning, seat temperature and inside temperature of a vehicle when the vehicle engine is turned off, the system comprising: (a) a solar cell module providing driving power from solar heat; and (b) a controller operating the solar cell module by stepwise magnitudes of a current input from the solar cell module. A method for controlling the system is also provided.

7 Claims, 2 Drawing Sheets

SYSTEM AND METHOD FOR OPERATING AIR CONDITIONER USING SOLAR HEAT

CROSS-REFERENCE TO RELATED APPLICATION

This application claims priority to and the benefit of Korean Patent Application No. 10-2006-0081806 filed in the Korean Intellectual Property Office on Jun. 13, 2006 the entire contents of which are incorporated herein by reference.

BACKGROUND OF THE INVENTION (a) Field of the Invention

The present invention relates to a system and a method for operating an air conditioner using solar heat, and more particularly to a system and a method for operating an air conditioner using solar heat which sequentially operates and controls simple ventilation, air cleaning, seat temperature regulation, and a thermoelectric element module depending on magnitude of solar light.

(b) Background

When a vehicle is parked outside in a summer season for a long time, temperature of the cabin may abruptly increase because outside temperature is high. In this state, even when a passenger getting in the vehicle opens windows to ventilate it for a while, temperature of the cabin cannot easily go down, and so a passenger may feel uncomfortable. An apparatus for cooling or heating a seat may be used in order to control temperature of the seat at a suitable temperature. But there is a limit in performance of a thermoelectric element installed in the seat, so the thermoelectric module cannot effectively operate at a high temperature, and it cannot operate while a vehicle is turned off.

In addition, there might be explosions of a lighter or a battery of a cellular phone due to high temperature inside the cabin, and children or pets staying in the cabin of high temperature for a long time might be suffocated.

If temperature of the cabin increases, a large amount of volatile organic compounds may increase, thereby contaminating the air inside the cabin. Contaminants generated by smoking or foods may be adsorbed in the cabin to contaminate the cabin or generate odors. In addition, molds may form in condensed water remaining in an evaporator or a duct of an air conditioner after the vehicle is turned off, thereby generating odors.

Humidity in the air conditioner may increase by condensed water, so windows may be steamed up in an early stage of a vehicle operation.

There is thus a need for a system for operating an air conditioner using solar heat, which can reduce a difference between the inside and outside temperatures of a vehicle and provide more comfortable conditions by sequentially operating and controlling ventilation, air cleaning, seat temperature and inside temperature of a vehicle by magnitude of solar light.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention provides a system for controlling at least two functions selected from the group consisting of ventilation, air cleaning, seat temperature and inside temperature of a vehicle when the vehicle engine is turned off, the system comprising: (a) a solar cell module providing driving power from solar heat; and (b) a controller operating the solar cell module by stepwise magnitudes of a current input from the solar cell module.

A preferred embodiment of the present invention may further comprise: (a) an ambient temperature sensor mounted outside the vehicle to detect outside air temperature; (b) a cabin temperature sensor mounted inside the cabin to detect inside air temperature; (c) an air conditioner operably linked to the controller; (d) an air cleaner operably linked to the controller; and (e) a seat cooling/heating module mounted to a seat to regulate seat temperature and operably linked to the controller.

In another aspect, a method for controlling the system is provided comprising the steps of: (a) determining whether the vehicle is turned off; (b) converting an operation mode of the air conditioner to an outside air circulation mode and applying a current input from the solar cell module; (c) determining whether a difference between the temperature inside the cabin and the temperature of the outside air is greater than a predetermined temperature; (d) determining whether an input current is greater than $\alpha$, if the temperature difference is greater than the predetermined temperature; (e) operating the air cleaner, if the input current is greater than $\alpha$; (f) determining whether the input current is greater than $\beta$, after the air cleaner is operated; (g) operating the air blower of the air conditioner, if the input current is greater than $\beta$; (h) determining whether the input current is greater than $\gamma$, after the air blower of the air conditioner is operated; (i) operating the seat cooling/heating module, if the input current is greater than $\gamma$; (j) determining whether the input current is greater than $\delta$, after the seat cooling/heating module is operated; and (k) operating the thermoelectric module of the air conditioner, if the input current is greater than $\delta$.

In still another aspect, motor vehicles are provided that comprise a described system or comprise a system controlled by a described method.

It is understood that the term "vehicle" or other similar term as used herein is inclusive of motor vehicles in general such as passenger automobiles, buses, trucks, various commercial vehicles, and the like.

Other aspects of the invention are discussed infra.

Figure 1:
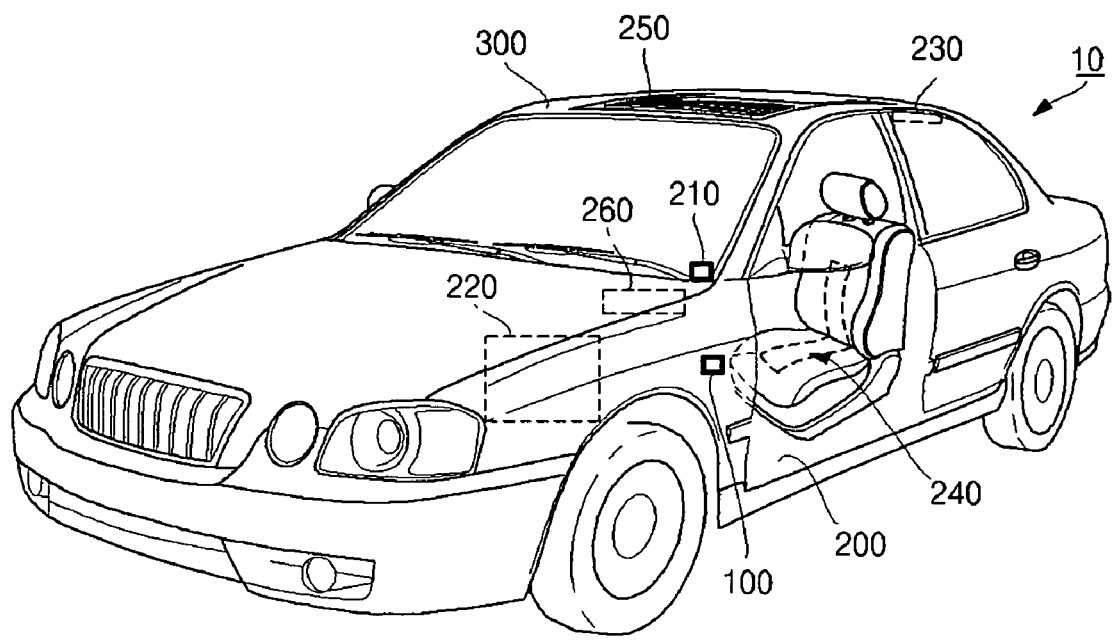
FIG. 1 is a drawing schematically showing a system for operating an air conditioner using solar heat according to an exemplary embodiment of the present invention.

Reference numerals set forth in the Drawings includes reference to the following elements as further discussed below:

100: ambient temperature sensor
210: cabin temperature sensor
220: air conditioner
222: air inlet part
224: air blower
226: thermoelectric element module
228: ion generator
230: air cleaner

240: seat cooling/heating module
250: solar cell module
260: controller

DETAILED DESCRIPTION

As discussed above, in one aspect, the present invention provides a system for controlling at least two functions selected from the group consisting of ventilation, air cleaning, seat temperature and inside temperature of a vehicle when the vehicle engine is turned off, the system comprising: (a) a solar cell module providing driving power from solar heat; and (b) a controller operating the solar cell module by stepwise magnitudes of a current input from the solar cell module.

In a preferred embodiment, the system may further comprise: (a) an ambient temperature sensor mounted outside the vehicle to detect outside air temperature; (b) a cabin temperature sensor mounted inside the cabin to detect inside air temperature; (c) an air conditioner operably linked to the controller; (d) an air cleaner operably linked to the controller; and (e) a seat cooling/heating module mounted to a seat to regulate seat temperature and operably linked to the controller.

The air conditioner, the air cleaner, and the seat cooling/heating module may suitably be provided with the driving power produced by the solar cell module.

Also preferably, the air conditioner, the air cleaner, and the seat cooling/heating module may be controlled by the solar cell module.

In another preferred embodiment, air conditioners may suitably comprise (a) an air inlet part sucking inside air of the cabin, (b) an air blower introducing outside air into the inner part of the vehicle and supplying cooled or heated air into the cabin, and (c) a thermoelectric element module for cooling or heating the vehicle.

In still another preferred embodiment, air conditioners may further comprise an ion generator to sterilize inside environment and remove odors.

Suitably, magnitudes of a current input from the solar cell module may be divided into four steps of $\alpha$, $\beta$, $\gamma$, and $\delta$ (e.g., $\alpha < \beta < \gamma < \delta$).

In another aspect, the present invention provides a method for controlling the system, comprising the steps of: (a) determining whether the vehicle is turned off; (b) converting an operation mode of the air conditioner to an outside air circulation mode and applying a current input from the solar cell module; (c) determining whether a difference between the temperature inside the cabin and the temperature of the outside air is greater than a predetermined temperature; (d) determining whether an input current is greater than $\alpha$, if the temperature difference is greater than the predetermined temperature; (e) operating the air cleaner, if the input current is greater than $\alpha$; (f) determining whether the input current is greater than $\beta$, after the air cleaner is operated; (g) operating the air blower of the air conditioner, if the input current is greater than $\beta$; (h) determining whether the input current is greater than $\gamma$, after the air blower of the air conditioner is operated; (i) operating the seat cooling/heating module, if the input current is greater than $\gamma$; (j) determining whether the input current is greater than $\delta$, after the seat cooling/heating module is operated; and (k) operating the thermoelectric module of the air conditioner, if the input current is greater than $\delta$.

In a preferred embodiment, if magnitudes of the current input from the solar cell module are in order of $\alpha > \beta > \gamma > \delta$, the controller may suitably control the ambient temperature sensor, the cabin temperature sensor, the air conditioner, the air cleaner, the seat cooling/heating module, and the solar cell module so as to perform the above steps in its reverse order.

An exemplary embodiment of the present invention will hereinafter be described in detail with reference to the accompanying drawings.

Figure 2:
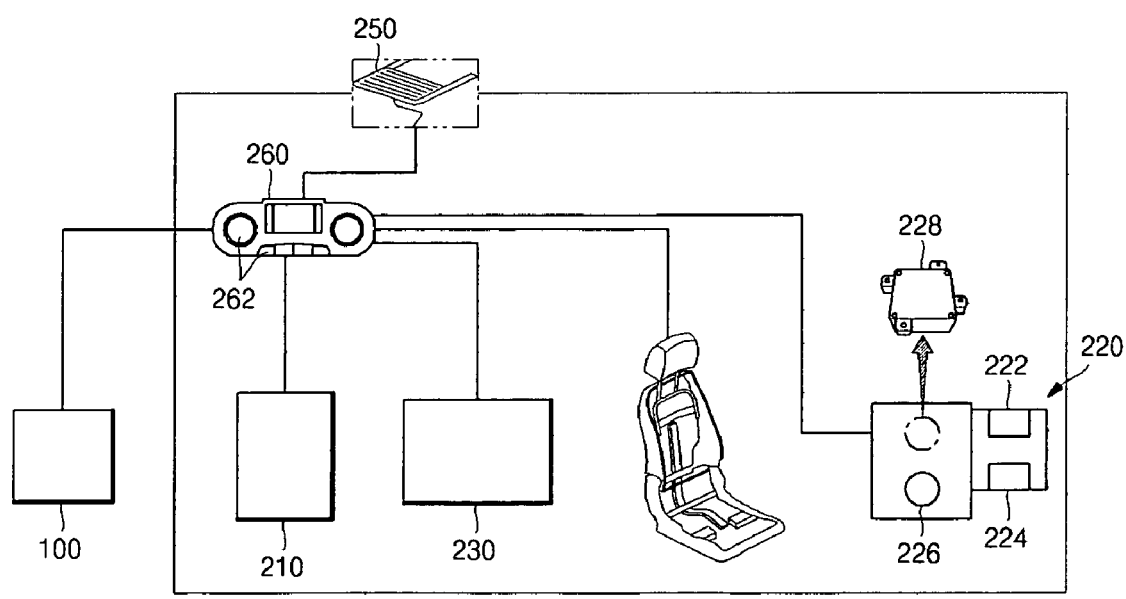
FIG. 2 is a diagram of a system for operating an air conditioner using solar heat of FIG. 1.

FIG. 1 is a drawing schematically showing a system for operating an air conditioner using solar heat according to an exemplary embodiment of the present invention, and FIG. 2 is a diagram of a system for operating an air conditioner using solar heat of FIG. 1.

As shown in FIG. 1 and FIG. 2, a system for operating an air conditioner using solar heat according to an exemplary embodiment of the present invention may include: an ambient temperature sensor 100 and a cabin temperature sensor 210 respectively mounted inside and outside of a vehicle 10; an air conditioner 220 ventilating and cooling/heating the inner part of the vehicle 10; an air cleaner 230 cleaning air inside the vehicle 10; a seat cooling/heating module 240 regulating temperature of a seat; a solar cell module 250 operating the air conditioner 220, the air cleaner 230, and the seat cooling/heating module 240 using solar heat; and a controller 260 controlling these members.

The ambient temperature sensor 100 can detect temperature of air outside the vehicle 10, and the cabin temperature sensor 210 can detect temperature inside a cabin 200. After the vehicle 10 is turned off, the controller 260 determines whether to operate an air conditioning system according to a difference between the two temperatures detected by the ambient temperature sensor 100 and the cabin temperature sensor 210.

The air conditioner 220 may include an air inlet part 222 sucking the air inside the cabin 200, an air blower 224 introducing outside air into the inner part of the vehicle 10 and supplying cooled or heated air into the cabin 200, and a thermoelectric element module 226 for cooling or heating the vehicle 10. In addition, an ion generator 228 for sterilizing the inside of the air conditioner 220 and removing odors may be provided to the air conditioner 220.

As shown in FIG. 2, the air conditioner 220 can ventilate the cabin 200 by the air inlet part 222 and the air blower 224, and the supplied air cooled or heated by the thermoelectric element module 226 into the cabin 200 via the air blower 224 if cooling or heating is required.

If condensed water remains in an evaporator or a duct after the operation of the air conditioner 220, the condensed water may be corrupted or mildew may easily be formed therein due to the remaining heat.

Accordingly, a bad odor may occur in an early stage of operation of the air conditioner 220, causing sanitary problems. In order to solve these problems, ion generator 228 generating ions can be adopted so as to sterilize inner part of air conditioner 220 and remove bad odor.

The air cleaner 230 can clean the air inside the cabin 200, and may be designed as any suitable type of an air cleaner which can be mounted to the vehicle 10.

The seat cooling/heating module 240 may regulate temperature of a seat of the vehicle 10. The seat cooling/heating module 240 can be provided with a thermoelectric element, thereby cooling the seat so as to maintain the seat to be cool in a summer season, and heating the seat so as to maintain the seat to be heated in a cold winter season.

The solar cell module 250 may be disposed onto a roof panel 300 of the vehicle 10 or at a lower portion of a rear window of the roof panel 300 so as to efficiently collect solar light. The solar cell module 250 may provide driving power to operate the air conditioner 220, the air cleaner 230, and the seat cooling/heating module 240 after the vehicle 10 is turned off, using solar energy.

As shown in FIG. 1 and FIG. 2, the controller 260 can be provided with a switch 262 for controlling the air conditioner 220, the air cleaner 230, the seat cooling/heating module 240, the solar cell module 250, etc. A user can manipulate the switch 262 so as to operate the controller 260, and the controller may operate according to predetermined conditions.

The controller 260 may drive the air conditioner 220, the air cleaner 230, and the seat cooling/heating module 240 by the driving force exerted from vehicle engine in a state that the vehicle 10 is turned on. On the other hand, it may drive the air conditioner 220, the air cleaner 230, and the seat cooling/heating module 240 by driving the solar cell module 250 in a state that the vehicle 10 is turned off.

In the case of parking the vehicle 10 in an open place for a long time in a summer season, temperature inside the vehicle 10 may abruptly increase according to the increase in outside temperature. In order to prevent temperature inside the cabin 200 from abruptly increasing, the controller 260 can drive the solar cell module 250 to regulate temperature inside the cabin 200 (detailed explanations for this will be made later on).

Operating processes of a system for operating an air conditioner using solar heat according to an exemplary embodiment of the present invention as described above will be explained hereinafter.

Figure 3:
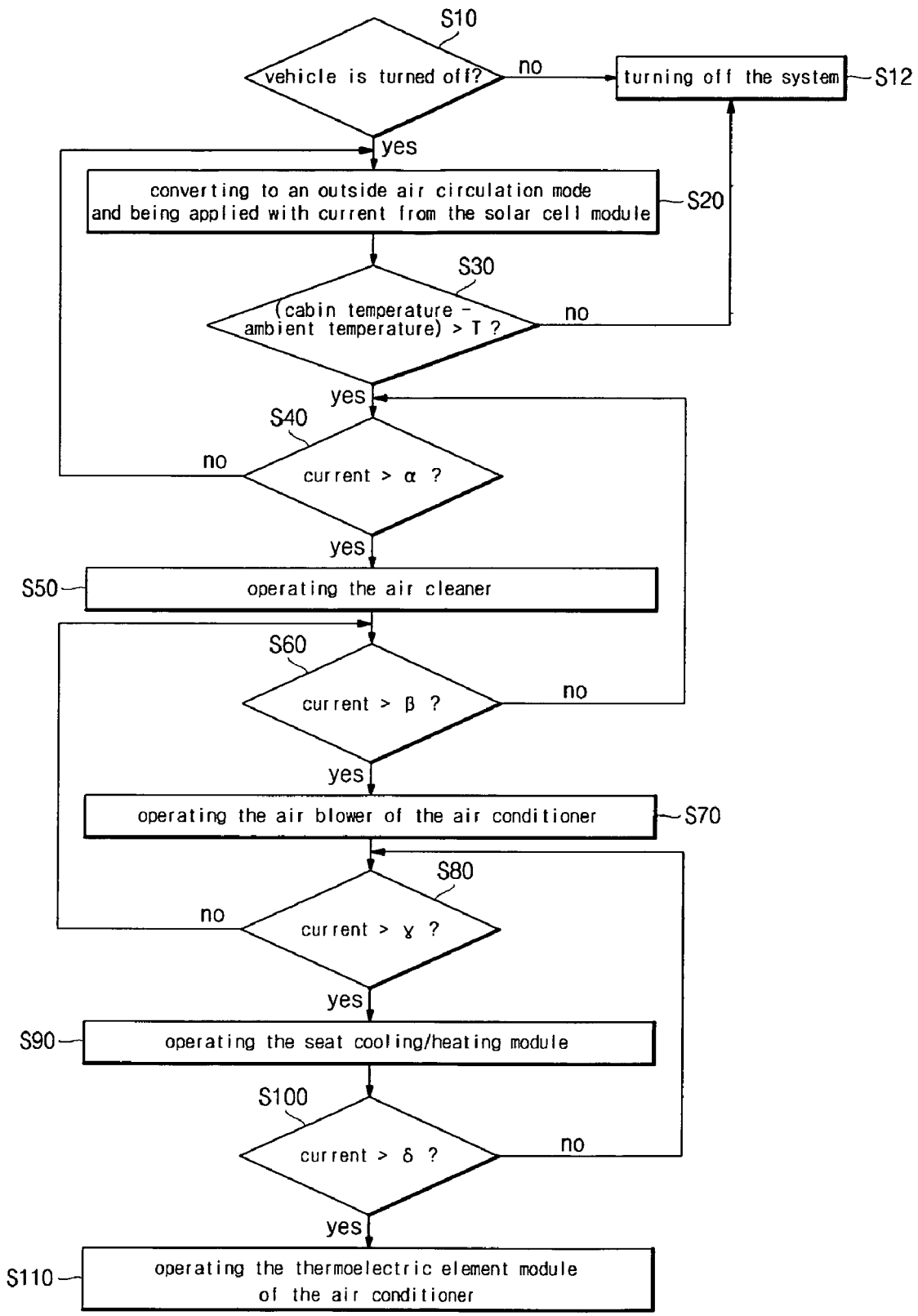
FIG. 3 is a flowchart of a method for controlling a system for operating an air conditioner using solar heat of FIG. 1.

FIG. 3 is a flowchart of a method for controlling a system for operating an air conditioner using solar heat of FIG. 1.

As shown in FIG. 3, in the case that the vehicle 10 is parked in an open place for a long time in a summer season, the controller 260 may control in the following sequence such that temperature inside the cabin 200 cannot abruptly increase.

At first, the controller 260 may determine whether the vehicle 10 is turned off at step S10, and if so, the controller 260 may convert an operation mode of the air conditioner 220 to an outside air circulation mode so as to ventilate the cabin 200, and is applied with current from the solar cell module 250, at step S20. However, if it is determined that the vehicle 10 is not turned off, a system does not operate at step S12.

Preferably, magnitude of a current input from the solar cell module 250 may be divided into four steps of $\alpha$, $\beta$, $\beta$, and $\delta$ ($\alpha<\beta<\gamma<\delta$) depending on magnitude of solar light. A user may set the system for operating an air conditioner using the solar cell module 250 to operate when a difference between cabin temperature and ambient temperature is greater than a specific value. Alternatively, this may be preset in the vehicle.

After the controller 260 is applied with current from the solar cell module 250, the controller 260 determines whether a difference between cabin temperature and ambient temperature is greater than a predetermined temperature (for example, 0° C.) at step S30. If the determination at step S30 is affirmative, the controller 260 determines whether current input from the solar cell module 250 is greater than a predetermined current a at step S40 (the input current denotes the magnitude of solar light).

If the input current is not greater than the predetermined current $\alpha$, the outside air circulation mode of the air conditioner 220 is maintained. On the other hand, if input current is greater than the predetermined current $\alpha$, the controller 260 controls the air cleaner 230 to operate at step S50 so as to clean air inside the cabin 200.

After the air cleaner 230 is operated, the controller 260 determines at step S60 whether the input current is greater than $\beta$. If the input current is not greater than $\beta$, the control procedure returns to the step S40. If the input current is greater than $\beta$, the controller 260 operates a blower fan of the air conditioner 220 so as to operate the air blower 224 at step S70.

After the air blower 224 is operated, the controller 260 determines at step S80 whether the input current is greater than $\gamma$. If the input current is not greater than $\gamma$, the control procedure returns to the step S60. If the input current is greater than $\gamma$, the controller 260 operates the seat cooling/heating module 240 so as to cool the seat at step S90. Thereby, when a user gets in the vehicle 10, a user may not feel discomfort caused by high temperature of the seat.

After the seat cooling/heating module 240 is operated, the controller 260 determines at step S100 whether the input current is greater than $\delta$. If the input current is not greater than $\delta$, the control procedure returns to the step S80. If the input current is greater than $\delta$, the controller 260 operates a thermoelectric element module installed in the air conditioner 220 so as to cool the cabin 200.

Since the cabin 200 is simply ventilated, or air is cleaned, temperature of the seat is regulated, and cooling is automatically performed, according to the magnitude of solar light, the cabin 200 can be maintained cool so that a passenger may not feel discomfort when he gets in the vehicle 10.

In addition, since the air conditioner is operated by the energy of the solar cell module 250 instead of consuming fuel, the temperature inside the cabin 200 can be regulated without consuming fuel.

Contrary to the above-described processes, if the magnitude of solar light becomes gradually weak so that the magnitude of the input current becomes in the state of $\alpha>\beta>\delta>\delta$, the processes may be performed in reverse order, thereby preventing the cabin 200 from being excessively cooled. Accordingly, temperature inside the cabin 200 can be maintained at a suitable temperature.

The system provided by the present invention may also be used for preheating the cabin or the seat in the winter season. In this case, since magnitude of solar light in winter is different from that in summer, it may be necessary that the predetermined currents $\alpha$, $\beta$, $\gamma$, and $\delta$ are reset.

As described above, the system and the method according to exemplary embodiments of the present invention can sequentially perform ventilation, air cleaning, seat temperature regulation, and thermoelectric element module, so that the temperature inside the cabin can be prevented from abruptly increasing in summer.

Further, steaming up of windows or forming of mold due to condensed water remaining in an evaporator or a duct of an air conditioner can be prevented.

In addition, dangers of explosions of a lighter or a cellular phone due to high temperature inside the cabin can be prevented, and suffocations of children or pets can be prevented.

Generations of volatile organic compounds due to a temperature rise in the cabin can be minimized, so that contamination of air inside the cabin can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a system for controlling at least two functions selected from the group consisting of ventilation, air cleaning, seat temperature and inside temperature of a vehicle when the vehicle engine is turned off, the system comprising (a) a solar cell module providing driving power from solar heat; and (b) a controller operating the solar cell module by stepwise magnitudes of a current input from the solar cell module, the method comprising:
(a) determining whether the vehicle is turned off;
(b) converting an operation mode of a air conditioner to an outside air circulation mode and applying a current input from the solar cell module;
(c) determining whether a difference between the temperature inside the cabin and a temperature of the outside air is greater than a predetermined temperature;
(d) determining whether an input current is greater than a first predetermined current input level, if the temperature difference is greater than the predetermined temperature;
(e) operating the air cleaner, if the input current is greater than the first predetermined current input level;
(f) determining whether the input current is greater than a second predetermined current input level, after the air cleaner is operated;
(g) operating the air blower of a air conditioner, if the input current is greater than the second predetermined current input level;
(h) determining whether the input current is greater than a third predetermined current input level, after the air blower of the air conditioner is operated;
(i) operating a seat cooling/heating module, if the input current is greater than the third predetermined current input level;
(j) determining whether the input current is greater than a fourth predetermined current input level, after the seat cooling/heating module is operated; and
(k) operating a thermoelectric module of the air conditioner, if the input current is greater than the fourth predetermined current input level.

2. The method of claim 1 wherein if magnitudes of the current input from the solar cell module are in order of (the first predetermined current input level)>(the second predetermined current input level)>(the third predetermined current input level)>(the fourth predetermined current input level), the controller controls the outdoor air temperature sensor, the cabin temperature sensor, the air conditioner, the air cleaner, the seat cooling/heating module, and the solar cell module so as to perform the steps of (a) through (k) reversely.

3. The method of claim 1, wherein the system further comprises: (a) an ambient temperature sensor mounted outside the vehicle to detect outside air temperature; (b) a cabin temperature sensor mounted inside the cabin to detect inside air temperature; (c) an air conditioner operably linked to the controller; (d) an air cleaner operably linked to the controller; and (e) a seat cooling and/or heating module mounted to a seat to regulate seat temperature and operably linked to the controller.

4. The method of claim 3, wherein the air conditioner, the air cleaner, and the seat cooling and/or heating module are provided with driving power produced by the solar cell module.

5. The method of claim 4, wherein the air conditioner, the air cleaner, and the seat cooling and/or heating module are controlled by the solar cell module.

6. The method of claim 3, wherein the air conditioner comprises (a) an air inlet part sucking inside air of the cabin, (b) an air blower introducing outside air into a inner part of the vehicle and supplying cooled or heated air into the cabin, and (c) a thermoelectric element module for cooling or heating the vehicle.

7. The method of claim 3, wherein the air conditioner further comprises an ion generator to sterilize inside environment and remove odors.

* * * * *